United States Patent
Aubin

(10) Patent No.: US 10,377,176 B2
(45) Date of Patent: Aug. 13, 2019

(54) HIGH STRENGTH CASTER WITH DUAL OFFSET ORBITAL MOUNTING ASSEMBLY

(71) Applicant: Philip Aubin, Tracy, CA (US)

(72) Inventor: Philip Aubin, Tracy, CA (US)

( * ) Notice: Subject to any disclaimer, the term of this patent is extended or adjusted under 35 U.S.C. 154(b) by 0 days.

(21) Appl. No.: 15/833,366

(22) Filed: Dec. 6, 2017

(65) Prior Publication Data

US 2018/0162161 A1  Jun. 14, 2018

Related U.S. Application Data

(60) Provisional application No. 62/432,210, filed on Dec. 9, 2016.

(51) Int. Cl.
*B60B 33/00* (2006.01)

(52) U.S. Cl.
CPC ...... *B60B 33/0076* (2013.01); *B60B 33/0005* (2013.01); *B60B 33/0018* (2013.01); *B60B 33/0068* (2013.01); *B60B 33/0039* (2013.01)

(58) Field of Classification Search
CPC .............. B60B 33/0076; B60B 33/006; B60B 33/0065; B60B 33/0005; B60B 33/0018; Y10T 16/186; Y10T 16/1857; Y10T 16/216
See application file for complete search history.

(56) References Cited

U.S. PATENT DOCUMENTS

| | | | | |
|---|---|---|---|---|
| 314,958 A * | 3/1885 | Mendenhall | ........ | B60B 33/0042 16/48 |
| 349,982 A * | 9/1886 | Conklin | .............. | B60B 33/0002 16/23 |
| 438,422 A * | 10/1890 | Pederson | ............ | B60B 33/0002 16/23 |
| 743,552 A * | 11/1903 | Owens | ................ | B60B 33/0042 16/48 |
| 1,645,831 A * | 10/1927 | Tiedemann | ......... | B60B 33/0002 16/23 |
| 2,688,149 A * | 9/1954 | Popp | ................... | B60B 33/0002 16/18 R |
| 3,547,459 A * | 12/1970 | Lapham | .................. | B60B 33/00 16/20 |
| 3,606,986 A * | 9/1971 | Greenberg | ............ | C22B 15/006 266/225 |
| 4,254,532 A * | 3/1981 | Hager | ..................... | B60B 33/00 16/20 |
| 4,447,932 A * | 5/1984 | Mueller | .............. | B60B 33/0002 16/21 |

(Continued)

FOREIGN PATENT DOCUMENTS

WO    WO-9004348 A1 *  5/1990  ............. A47L 5/362

*Primary Examiner* — Chuck Y Mah
(74) *Attorney, Agent, or Firm* — Howard Cohen

(57) ABSTRACT

In a heavy duty orbital caster assembly that includes a rotatable wheel unit joined to a transfer plate that pivots about a mounting post extending from a mounting plate adapted to be secured to the bottom surface of an object, the improvement comprising a pair of roller bearing assemblies that extend upwardly from the upper surface of the transfer plate adjacent to the caster wheel post as it extends through its bearing. The rollers impinge on the lower surface of the mounting plate, and serve to transfer some of the load of the supported object directly to the caster wheel, enabling the support of very heavy loads.

13 Claims, 5 Drawing Sheets

(56) References Cited

U.S. PATENT DOCUMENTS

| | | | | |
|---|---|---|---|---|
| 4,509,227 A * | 4/1985 | Keane | .................... | A47L 9/009 |
| | | | | 15/327.2 |
| 6,760,953 B2 * | 7/2004 | Ben-Meir | ............. | B60B 33/001 |
| | | | | 16/18 R |
| 8,438,968 B2 * | 5/2013 | Warner | ............... | A47J 31/4403 |
| | | | | 99/279 |
| 2010/0247281 A1 * | 9/2010 | Kempf | ................ | B60B 33/0039 |
| | | | | 414/800 |
| 2012/0042472 A1 * | 2/2012 | Aubin | ................ | B60B 33/0015 |
| | | | | 16/46 |

* cited by examiner

HIGH STRENGTH CASTER WITH DUAL OFFSET ORBITAL MOUNTING ASSEMBLY

CROSS-REFERENCE TO RELATED APPLICATIONS

This application asserts the priority filing date benefit of Provisional Application 62/432,210, filed Dec. 9, 2016.

FEDERALLY SPONSORED RESEARCH

Not applicable.

SEQUENCE LISTING, ETC ON CD

Not applicable.

BACKGROUND OF THE INVENTION

Field of the Invention

This invention relates to casters and, more particularly, to high strength caster assemblies that allow the caster to pivot easily to accommodate the direction of thrust applied to an object supported by the caster.

Description of Related Art

A problem that is common to single wheel and twin wheel casters is that the casters can become "locked up" when at least two casters supporting a wheeled object are pivoted to extend in directions that are substantially misaligned with each other. For example, if a cart with four swiveling (pivoting) casters is pushed toward a wall and abutted against the wall surface, it may then become difficult to slide the cart along the wall to reposition it, due to the fact that the casters are misaligned with respect to the plane of the wall surface. In general, when casters, either single wheel or twin wheel, are forced to pivot about a vertical axis on the contact area that they engage on a floor or carpet, their rotational movement creates a substantial frictional resistance due to the fact that the wheels are not primarily rolling but rather are "scrubbing" on the contact area. The result is that objects supported by casters may be difficult to start to roll in a desired direction if that direction does not align with the casters. And precision placement of the object may involve a great deal more maneuvering than would otherwise be necessary if the casters were capable of easily tracking the direction of thrust.

An elegant solution to this problem is found in U.S. Pat. No. 8,387,209, issued to the present inventor on Mar. 5, 2013. It describes a dual offset orbital mounting assembly that enables the caster wheel assembly to easily align itself with the direction of thrust applied to a caster-supported object, even when the casters are misaligned. This invention has met with a great deal of technical and commercial success.

Due to the ease of use of the dual offset orbital mounting assembly, industrial customers and other users have asked for this type of caster in a larger format for much larger loads, on the order of ten times the original invention. Practical experience has shown that merely scaling up the assembly to larger dimensions may lead to unexpected mechanical problems. For example, there is a lateral offset between the mounting post that is secured to the mobile object and the head post of the caster. As the load becomes very large, there is a substantial shear force on the transfer plate created by the lateral offset between the load and its supporting caster. This shear force may warp the transfer plate and cause the assembly to fail.

Clearly the prior art shows the need for an improved dual offset orbital caster assembly that can support very large loads.

BRIEF SUMMARY OF THE INVENTION

The present invention generally comprises a heavy duty orbital caster assembly that enables the caster wheel to easily align itself with the direction of thrust applied to a caster-supported object. This advantageous feature is made possible by providing a dual pivot assembly in the caster mounting that is laterally offset, whereby the caster wheels may not only pivot about a wheel pivot axis that extends through the plane of the caster wheel, but also revolve orbitally about a mounting pivot axis that is laterally offset from the wheel axis. As a result, the caster assembly easily may assume the proper orientation for any thrust applied to the caster-supported object, whereby caster "lock-up" is eliminated.

The caster assembly is comprised of a transfer plate that is provided with a pair of cylindrical openings extending side-by-side in the plate and laterally offset. A pair of bearing assemblies are provided, each secured in a respective one of the openings. Joined in and extending through one of the bearing assemblies is a mounting post that extends to a mounting plate adapted to be secured to the bottom surface of an object. The mounting plate is fixed to the object, and the transfer plate is free to rotate about the axis of the mounting tube on its respective bearing assemblies. The caster head post is supported by the other of the bearing assemblies, which enables the caster assembly to pivot about a vertical axis for steering purposes. This assembly is described in more detail in U.S. Pat. No. 8,387,209.

In order to support extremely heavy loads, the caster assembly is augmented with a pair of roller bearing assemblies that extend upwardly from the upper surface of the transfer plate adjacent to the caster wheel post as it extends through its bearing. The rollers impinge on the lower surface of the mounting plate, and serve to transfer some of the load of the supported object directly to the caster wheel. Thus shear and torque forces that would otherwise distort and warp the transfer plate are reduced, and the dual offset orbital caster assembly is capable of supporting loads more than ten times the prior art devices. This increase in load capacity is achieved without diminishing the rotational freedom of the orbital caster assembly in any significant way.

In further aspects of the invention, the rollers may be provided with guards that extend from the transfer plate and enclose a substantial portion of the rollers to prevent objects or fingers of workers from becoming entangled in the rollers.

DETAILED DESCRIPTION OF THE INVENTION

Figure 1:
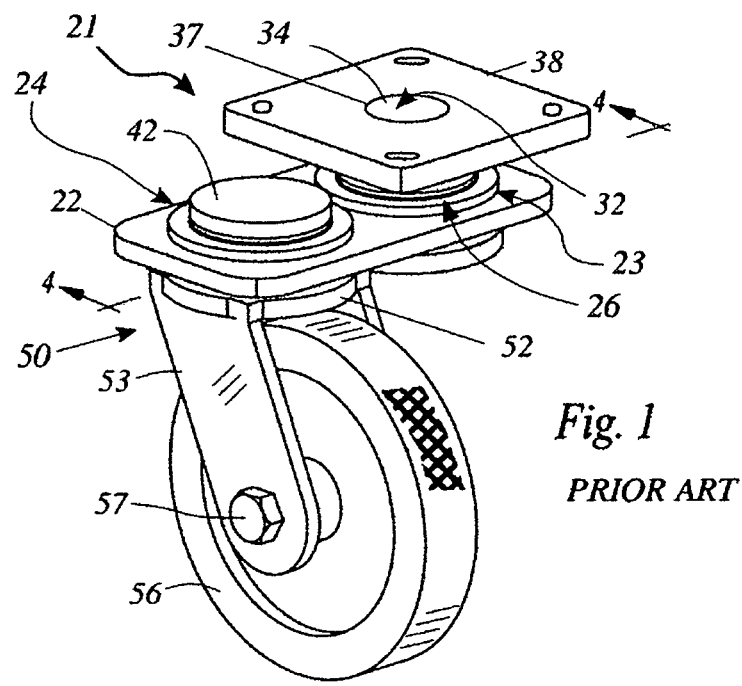
FIG. 1 is a perspective elevation of the prior art dual offset orbital caster assembly.

The present invention generally comprises an improved heavy duty caster assembly that enables the caster wheel to easily align itself with the direction of thrust applied to a caster-supported object. With regard to FIG. 1, there is shown a prior art caster assembly which forms the basis for the improvements of the present invention. As shown in FIG. 1, the prior art caster assembly 21 is composed of a transfer plate 22, which is a high strength plate (steel or the like) having two cylindrical openings 23 and 24 extending along adjacent, generally parallel axes A and B respectively. A mounting bearing assembly 26 includes mounting post 32, and the upper end 34 of the post 32 is received in an opening 37 of a mounting plate 38. It may be appreciated that the transfer plate 22 is freely rotatable about the mounting post 32 on bearings.

A head bearing assembly includes a head post 42 extending through bearings in the transfer plate. A clevis bracket 50 includes a central web portion 52 extending transversely, with a pair of arms 53 extending in parallel fashion from opposite sides of the central web 52 to support a wheel 56 on an axle 57 as is well-known in the prior art. The lower end of head post 42 is secured to the clevis bracket web 52, as by press fit, weldment, or the like.

Figure 2:
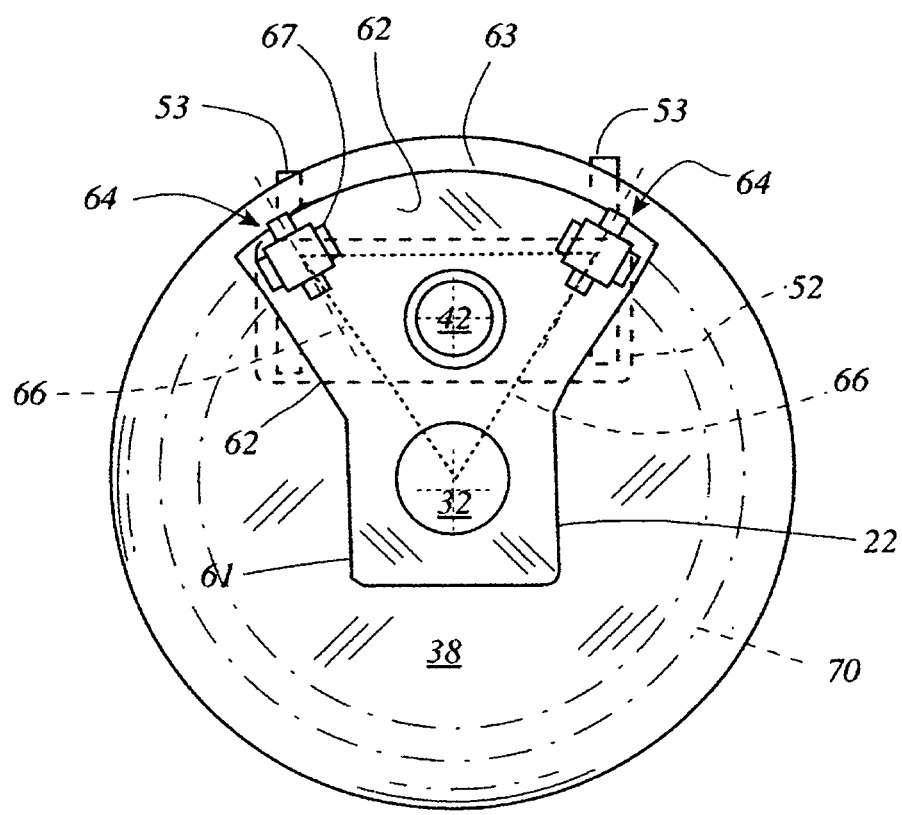
FIG. 2 is a functional plan layout of the mounting plate and transfer plate assemblies of the heavy duty dual offset orbital caster assembly of the present invention.

In the improved caster assembly (see FIGS. 2-6), the transfer plate 22 is a Y-shaped planate object that includes a rectangular portion 61 centered about the bearing shaft 32 and joined thereto. Extending from the portion 61 is a peripheral portion 62 with side edges that flare angularly outwardly as they extend radially outwardly from the shaft 32. The mounting plate 38 is formed as a generally circular disk that is coaxial with mounting post 32 and has a perimeter that is larger than the arcuate sweep of the outer edge 63 of the transfer plate. The outer edge 63 of the peripheral portion 62 is curved in general conformity to the curved edge of mounting plate 38, to which it is adjacent, as shown in FIGS. 2 and 5. As before, the head post 42 extends through bearings supported in the portion 62 of the transfer plate 22, and the clevis bracket 50 is supported by the head post 42 and depends therefrom for free rotation therewith.

Figure 3:
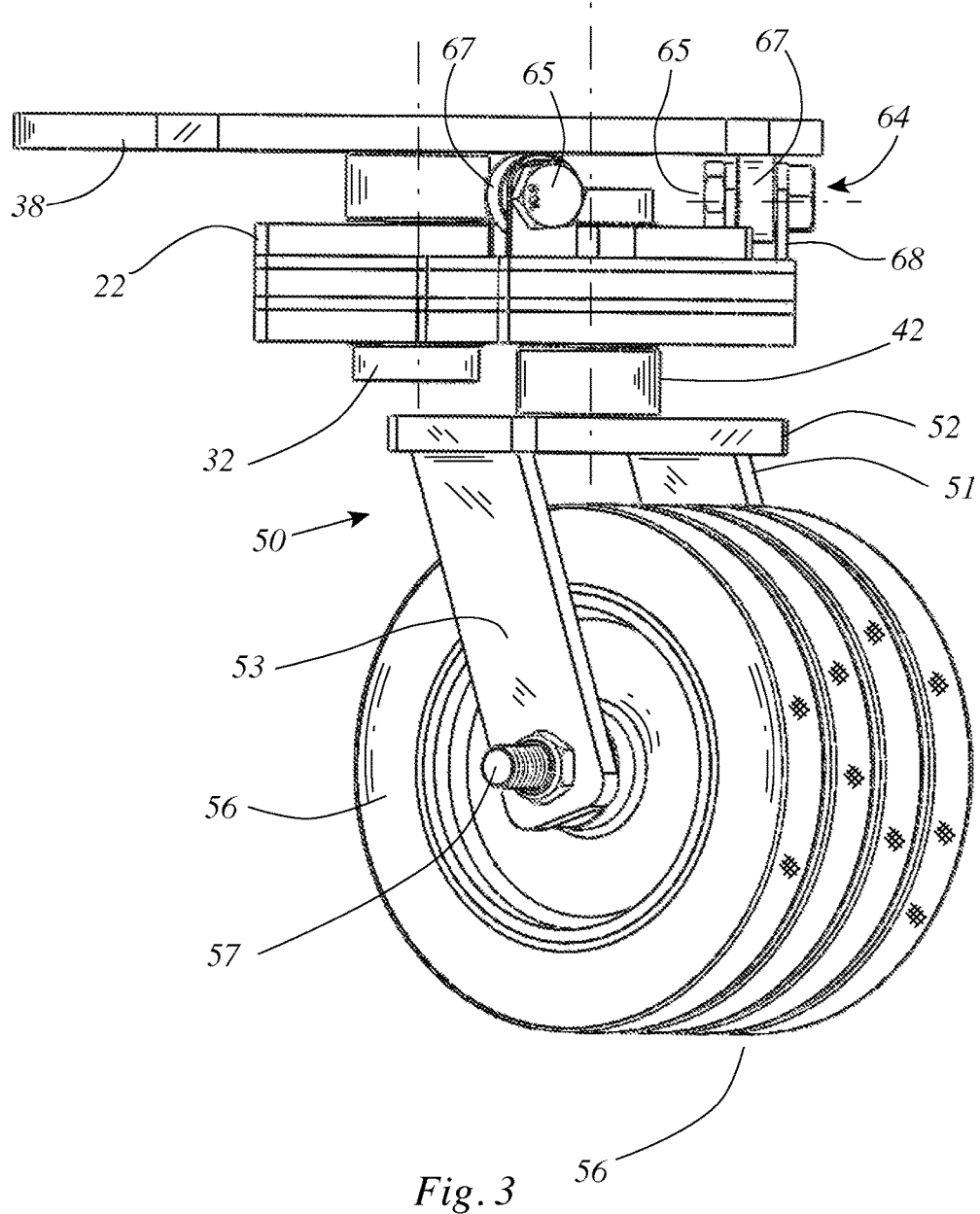
FIG. 3 is a side elevation of the heavy duty dual offset orbital caster assembly of the present invention.
Figure 4:
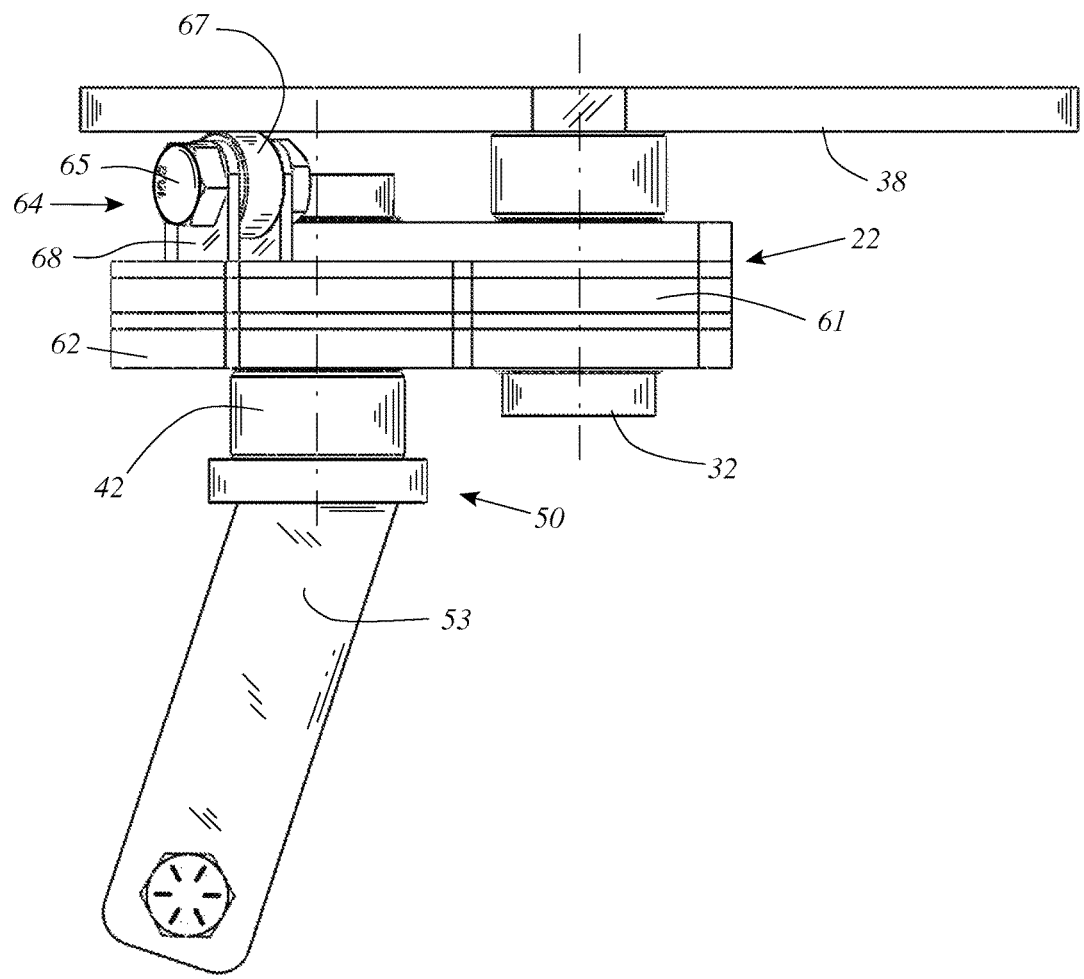
FIG. 4 is another side elevation as in FIG. 3, with the wheels removed and the transfer plate rotated to show further aspects of the heavy duty dual offset orbital caster assembly of the present invention.
Figure 5:
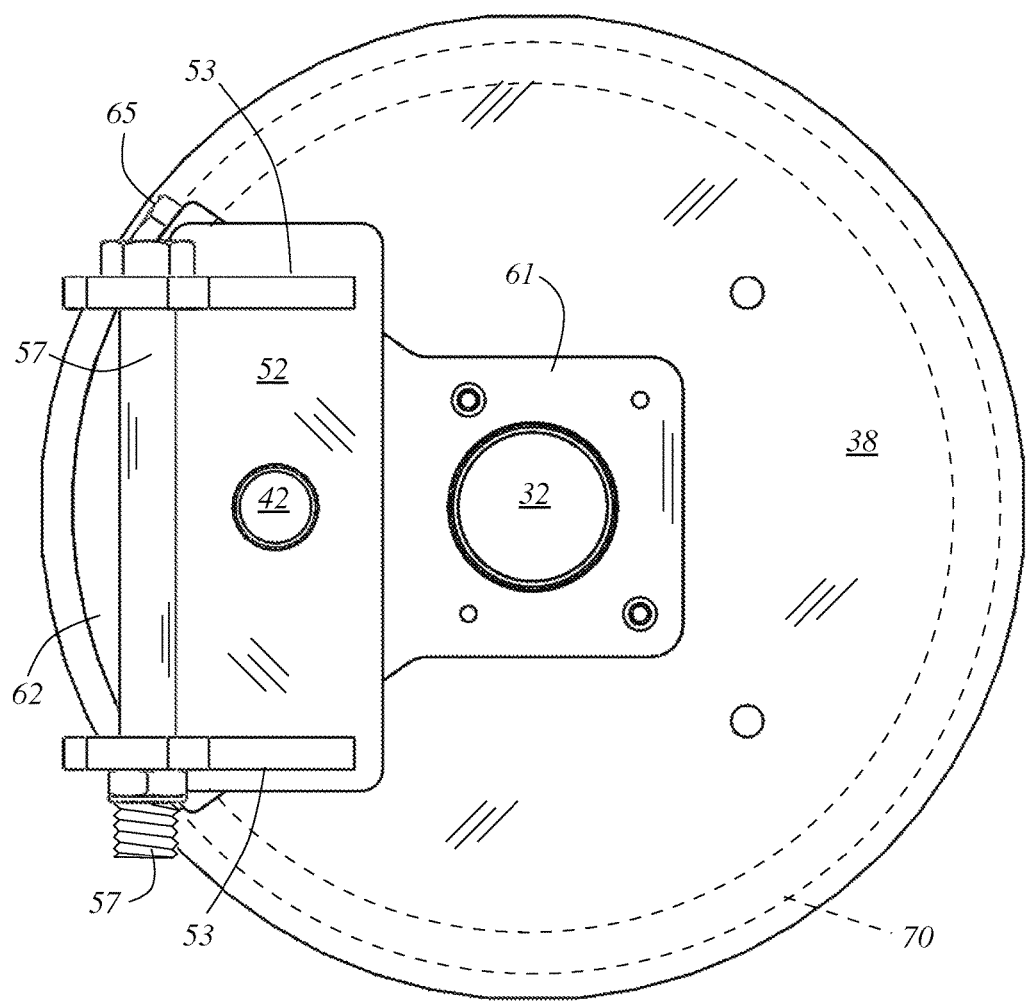
FIG. 5 is a bottom view layout of the transfer plate and mounting plate of the heavy duty dual offset orbital caster assembly of the present invention, shown with the wheels removed.

A salient feature of the improved caster assembly is the provision of a plurality of roller support bearings 64 mounted on the transfer plate portion 62 adjacent to the edge 63 thereof, as shown in FIGS. 3 and 4. The roller support bearings 64 include a clevis bracket 68 extending upwardly from the transfer plate 22 and supporting the opposed ends of roller shafts 65. Rollers 67 are secured to the shafts 65 and are dimensioned so that the rollers 67 contact the mounting plate 38 in a weight-bearing relationship. Note that the roller shafts 65 have axes that extend respectively generally along radii 66 (FIG. 2) with respect to the shaft 32, with the rollers rotating freely about the shafts. Thus the roller support bearings 64 describe a circular path 70 as they roll about the surface of the mounting plate 38, and are free to travel in either rotational direction as the orbital caster is driven to rotate and revolve by propulsive forces applied to the object supported by the caster assembly.

The roller support bearings 64 are provided to share some of the load applied by the object supported by the caster assembly; that is, the weight load is transmitted to the transfer plate 22 and the wheels 56 by not only the shaft 32, but also the rollers 67, forming a support triangle defined by radii 66 and a line joining the two roller bearings, as shown in broken lines in FIG. 2. Note that the shaft 42 is located within the outer boundary of the support triangle, at approximately the centroid of the triangle. Locating the shaft 42 within the support triangle creates a stable distribution of forces to the rollers 67 and shaft 32, and bending moment applied to the shaft 32 and the transfer plate 22 itself is greatly reduced, if not neutralized. Thus very heavy loads (up to many thousands of pounds) may be supported by the assembly without jeopardizing the free orbital motion of the apparatus.

Figure 6:
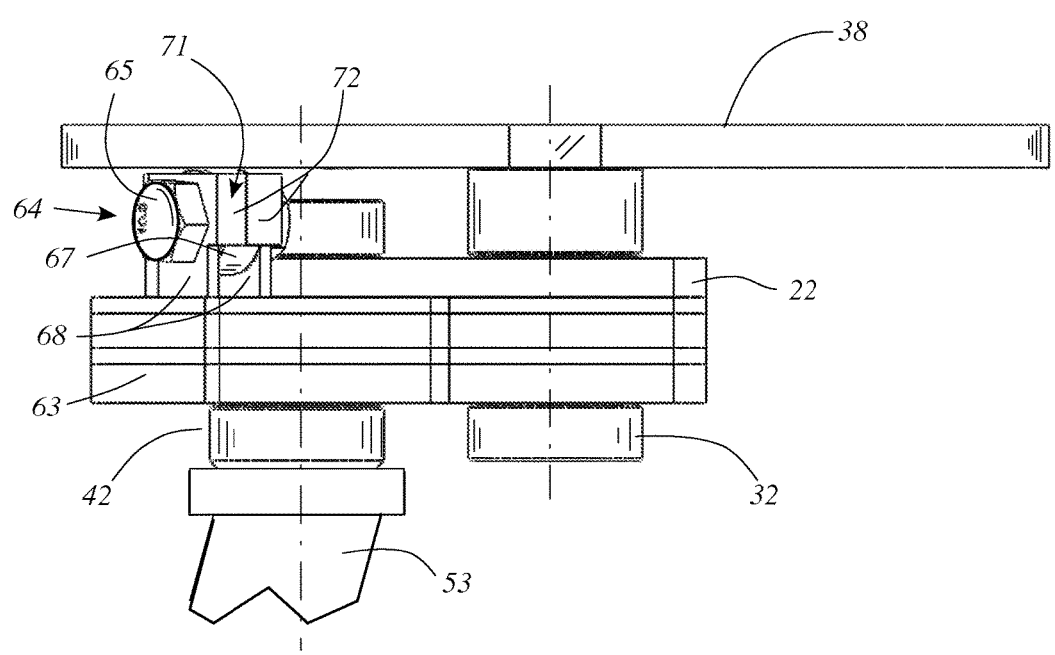
FIG. 6 is a partial side elevation of a further embodiment of the heavy duty dual offset orbital caster assembly of the present invention.

With regard to FIG. 6, a further embodiment of the invention includes a roller protector assemblies 71 disposed to protect the rollers 67 from contamination by particulates and liquids, as well as entanglements with fibrous materials such as hair, plastic trim debris, and the like. Most importantly, the protector assemblies 71 prevent the fingers or hair or clothing of users and workers from becoming entangled in the rollers. Each roller protector assembly includes at least one, or a pair of panels 72, each extending between and spanning the legs of bracket 68 directly adjacent to the roller 67. The distal edge of each panel 72 is located closely proximate to the adjacent surface of mounting plate 38 thereby blocking most objects from becoming entrained between the roller 67 and the bottom surface of the mounting plate 38.

Although a pair of roller bearing assemblies 64 are shown and described herein, it is clear that the invention may employ one or more or several roller roller bearing assemblies 64, as required by the magnitude of the expected load and the capacity of each roller bearing assembly, in accordance with good engineering practices. Likewise, the number of wheels 56 that are provided in the caster assembly may be more or less than the four wheels shown in the drawings.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In a heavy duty orbital caster assembly that includes a rotatable wheel unit disposed in ground-engaging fashion and joined by a head post to a transfer plate that pivots about a mounting post extending from a mounting plate adapted to be secured to the bottom surface of an object, the improvement comprising:

at least one roller bearing assembly secured between said mounting plate and said transfer plate in a load transferring relationship and disposed to extend upwardly from the upper surface of the transfer plate to contact said mounting plate in rolling fashion, wherein said at least one roller bearing assembly is secured to said transfer plate in a position radially spaced from said mounting post;

further including a pair of said roller bearing assemblies radially spaced from said mounting post and angularly spaced with respect to the rotational axis of said mounting post;

said mounting post and said pair of roller bearing assemblies comprising the vertices of a support triangle, and said head post is secured to said transfer plate within said support triangle;

said head post being located at approximately the centroid of said support triangle.

2. In a heavy duty orbital caster assembly that includes a rotatable wheel unit disposed in ground-engaging fashion and joined by a head post to a transfer plate that pivots about a mounting post extending from a mounting plate adapted to be secured to the bottom surface of an object, the improvement comprising:

at least one roller bearing assembly secured between said mounting plate and said transfer plate in a load transferring relationship and disposed to extend upwardly from the upper surface of the transfer plate to contact said mounting plate in rolling fashion;

wherein said at least one roller bearing assembly includes a roller shaft supporting a roller wheel, and a protector assembly to block objects from impinging on said roller wheel.

3. The improved orbital caster assembly of claim 2, wherein said at least one roller bearing assembly is secured to said transfer plate in a position radially spaced from said mounting post.

4. The improved orbital caster assembly of claim 3, wherein said roller shaft has a roller axis oriented to intersect with the rotational axis of said mounting post.

5. The improved orbital caster assembly of claim 4, wherein said roller wheel of said at least one roller bearing assembly travels on a circular path of contact with said mounting plate as said transfer plate rotates about said mounting post.

6. The improved orbital caster assembly of claim 4, further including a pair of said roller bearing assemblies radially spaced from said mounting post and angularly spaced with respect to the rotational axis of said mounting post.

7. The improved orbital caster assembly of claim 6, wherein said mounting post and said pair of roller bearing assemblies comprise the vertices of a support triangle, and said head post is secured to said transfer plate within said support triangle.

8. The improved orbital caster assembly of claim 7, wherein said head post is located at approximately the centroid of said support triangle.

9. The improved orbital caster assembly of claim 3, wherein said mounting plate includes a closed curved outer edge, and said at least one roller bearing assembly extends from said transfer plate to engage said mounting plate adjacent to said outer edge.

10. The improved orbital caster assembly of claim 9, wherein said closed curved outer edge comprises a circular perimeter that is concentric with said mounting post.

11. The improved orbital caster assembly of claim 3, wherein said transfer plate comprises a Y-shaped planate object having a central portion centered about said mounting post, and a peripheral portion extending from said central portion and having opposed side edges that flare angularly outwardly as they extend radially outwardly from said mounting post.

12. The improved orbital caster assembly of claim 11, further including a pair of said roller bearing assemblies radially spaced from said mounting post and angularly spaced with respect to the rotational axis of said mounting post, each roller bearing assembly being secured to said peripheral portion adjacent to one of said opposed side edges.

13. The improved orbital caster assembly of claim 2, wherein said at least one roller bearing assembly includes a clevis bracket supporting said roller shaft at opposed ends thereof, and at least one protector panel extending between and spanning said clevis bracket directly adjacent to said roller wheel and said mounting plate.

\* \* \* \* \*